Nov. 9, 1971  K. F. GOLAN ET AL  3,618,424
TRANSMISSION CONTROL SYSTEM
Filed Sept. 2, 1969  3 Sheets-Sheet 1
Fig-1-
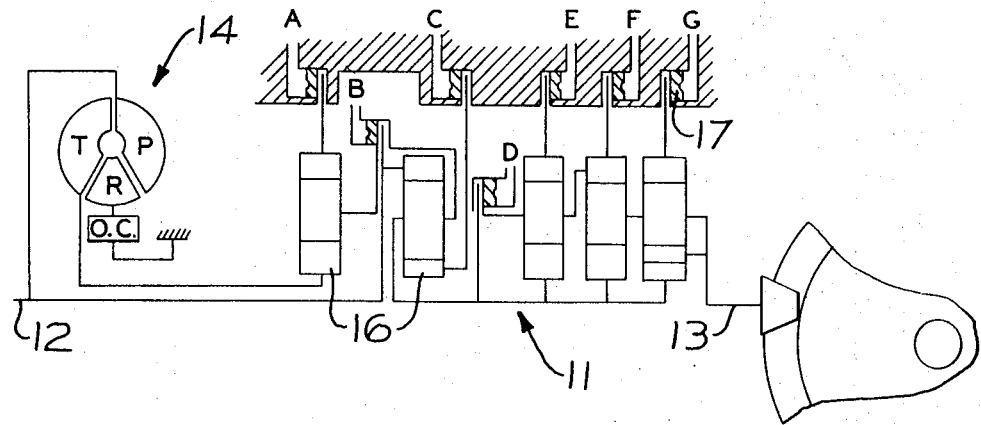
Fig-2-
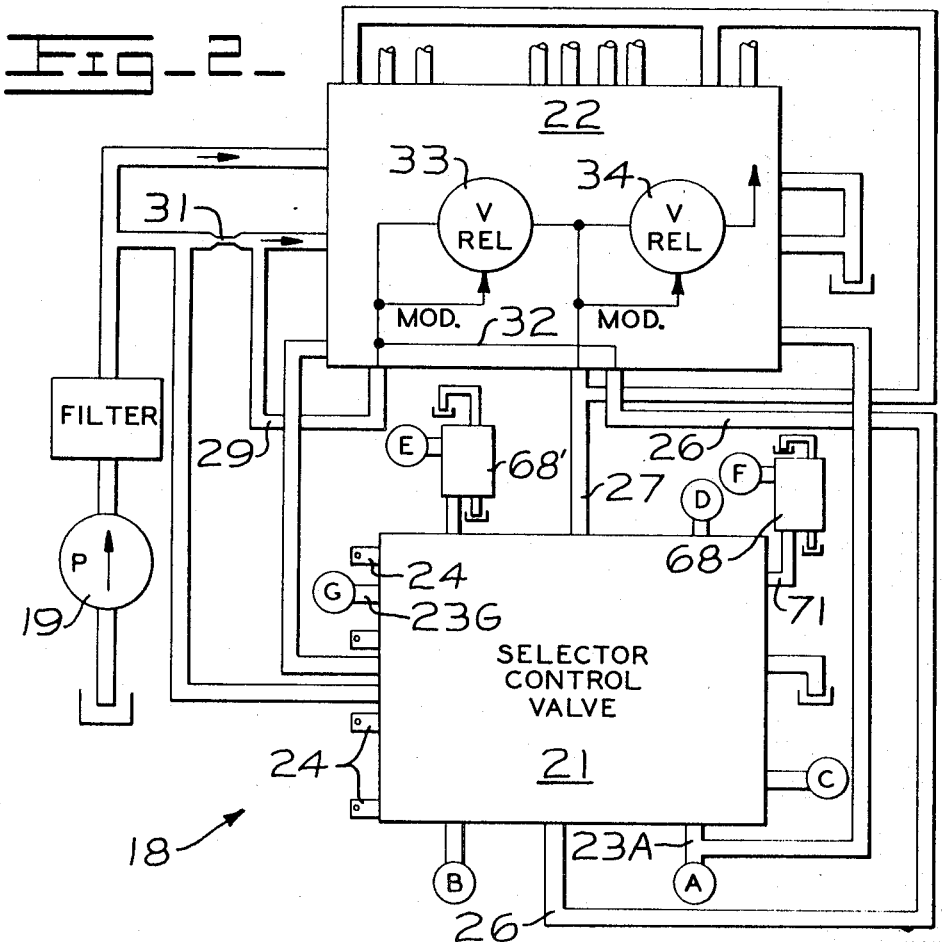
INVENTORS
KENNETH F. GOLAN
SHAIRYL I. PEARCE
BY
*Fryer, Tjensvold, Feix, Phillips & Lempio*
ATTORNEYS

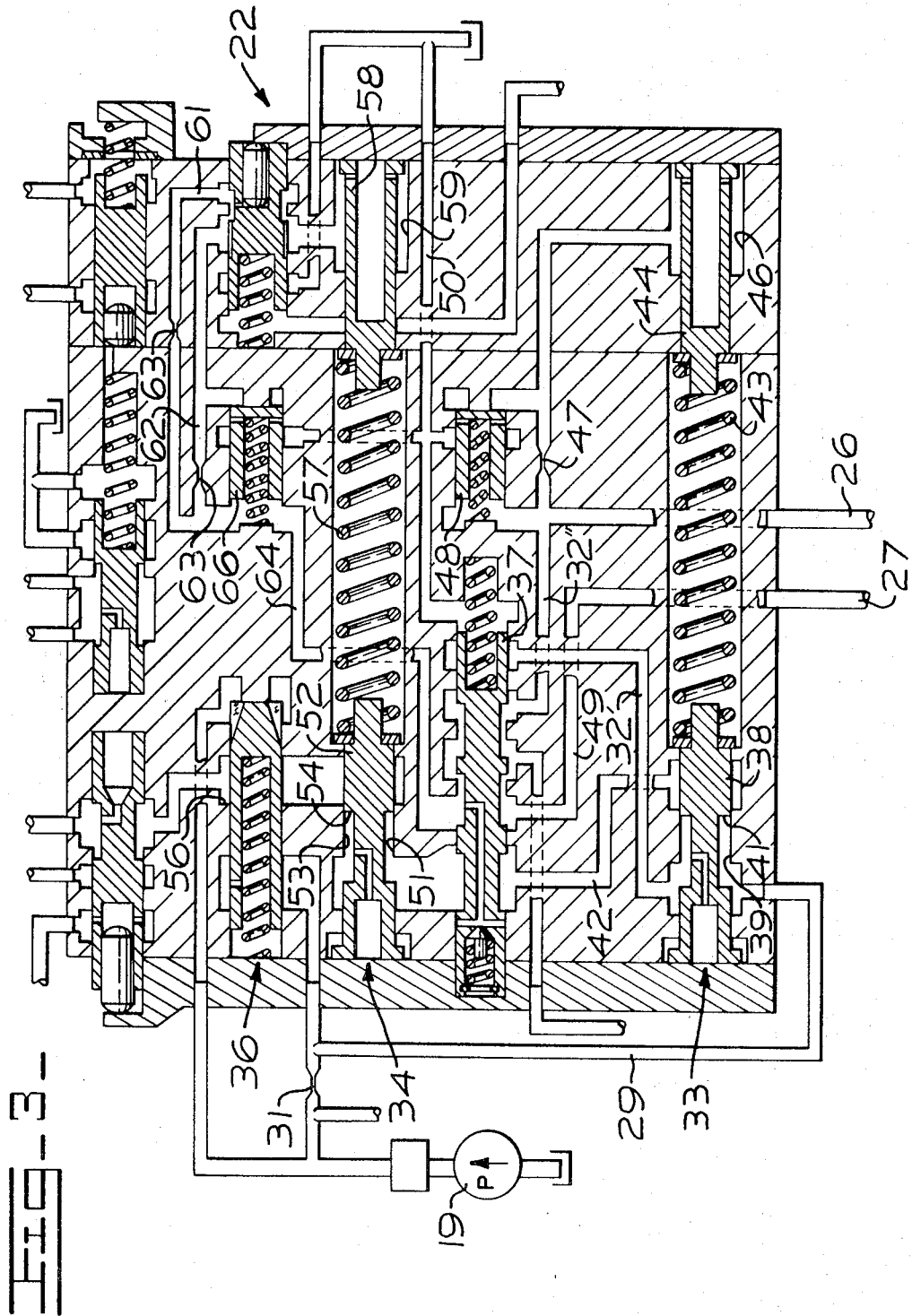

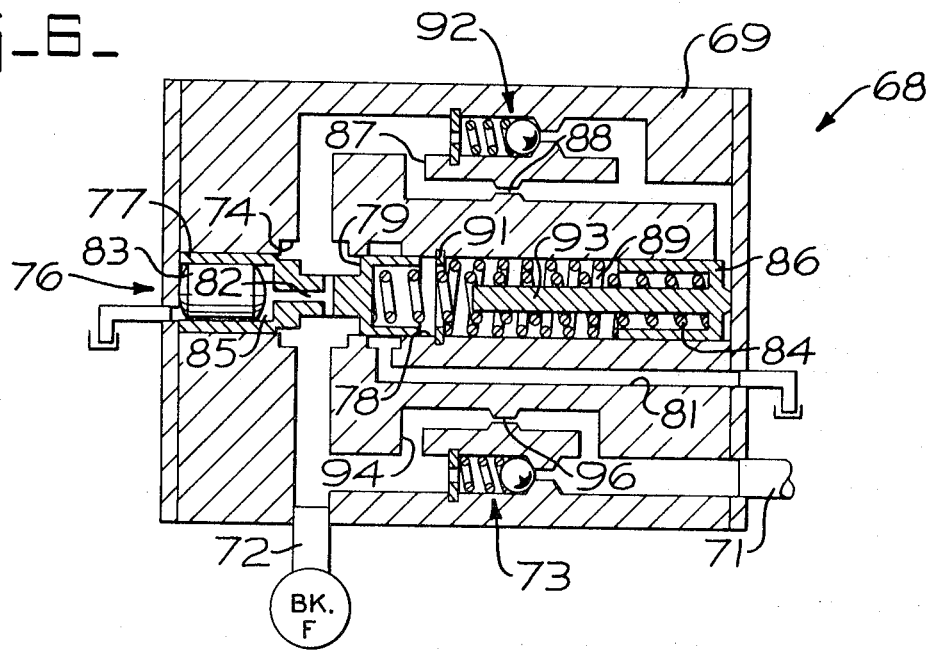
Fig-6-
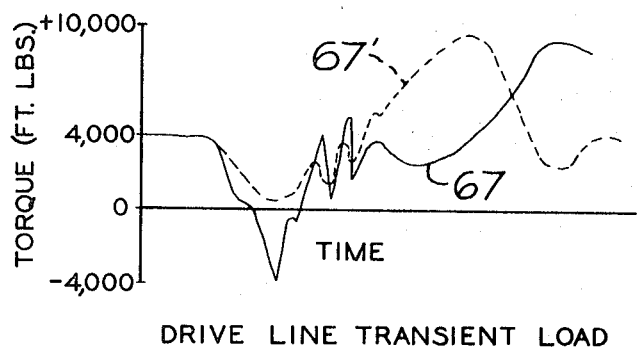
Fig-5-
DRIVE LINE TRANSIENT LOAD
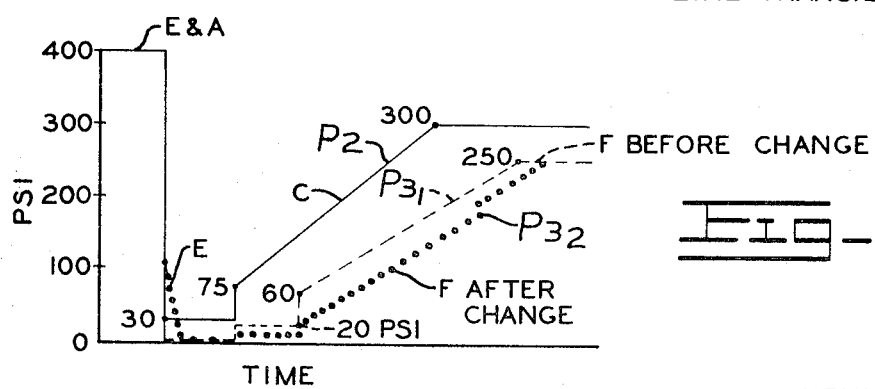
Fig-4-

3,618,424
TRANSMISSION CONTROL SYSTEM
Kenneth F. Golan, Pekin, and Shairyl I. Pearce, East Peoria, Ill., assignors to Caterpillar Tractor Co., Peoria, Ill.
Filed Sept. 2, 1969, Ser. No. 854,598
Int. Cl. B60k 33/00; F16d 25/062; F16h 57/10
U.S. Cl. 74—753
4 Claims

ABSTRACT OF THE DISCLOSURE

A planetary transmission having a series of fluid operated clutches and brakes, which are engaged and disengaged through a selector valve to change drive ratios, has means for modulating and sequencing the fluid pressures applied to the clutches and brakes to effect smooth shock free shifting. Basic control of the pressure at any of the clutches and brakes is effected by a single valve complex upstream from the selector valve while supplementary individual modulation means are provided downstream from the selector valve at one or more of the clutches or brakes to optimize performance during specific shifts.

BACKGROUND OF THE INVENTION

This invention relates to drive transmissions for vehicles and the like and more particularly to fluid control systems for shifting a transmission from one drive ratio to another.

Certain forms of drive transmissions, such as those of the planetary type, are usually provided with a series of fluid pressure operated clutches, brakes or the like which are engaged and disengaged in different combinations in order to shift the transmission to a selected one of the various drive ratios. Acceptably smooth shifting of such transmissions requires careful control of the fluid pressures at the engaging and disengaging clutches or brakes during the shift period and a variety of control systems have been developed for this purpose. U.S. Pat. 3,386,540, for example, discloses one such system.

Ordinarily, a particular control system is originally designed for use with a specific transmission and vehicle and difficulties may be encountered if it is later used with modified equipment. If the control system of the above identified U.S. Pat. 3,386,540, for example, is applied to progressively larger transmissions of the basic design disclosed therein, it will be found that there is increasing roughness in certain particular ones of the possible shifts. Similar problems are encountered when other known forms of transmission control system are used under conditions which differ from those for which the system is optimized. These problems arise from a variety of causes such as differences in the capacity of clutches and brakes in different transmissions, varying degrees of constriction in the flow passages to certain clutches or brakes, inertials, and the like.

To perform the pressure control functions, such systems include valving for the purpose of establishing initial fill pressures at the clutches or brakes and for modulating the rates of pressure rise and the timing and final pressures during the shift. Such valving is customarily located upstream from the selector valve that directs the fluid to the particular clutches or brakes involved in a particular shift. This arrangement is economical and compact in that it enables the same valving complex to perform the modulating for all of the clutches and brakes. However, it is also responsible in part for the difficulties described above. Difficulties which may be encountered in a specific clutch or brake during a specific shift cannot be corrected by adjusting the modulation system without in effect making the same adjustment for all other clutches and brakes wherein the adjustment may be undesirable.

In theory, the transmission and control system could be redesigned to avoid problems of the kind discussed above. In practice, economics rule out this approach except in aggravated cases. Because of the investment involved, manufacturers tend to continue to use an existing system although it may provide less than optimum shifting performance under certain conditions. Thus, a need exists for a compact and economical control system of this type which is more adaptable in the sense that individual control is available with respect to the fluid pressures applied to certain specific clutches or brakes.

SUMMARY OF THE INVENTION

This invention enables control systems of the kind wherein the basic modulating, timing, and pressure limiting functions are performed by a single valving group, located upstream from the selector valve, to be adapted to a variety of transmission and vehicle combinations by providing for supplementary pressure control, downstream of the selector valve, on only those clutches or brakes where it is required to overcome rough shifting.

Accordingly, it is an object of this invention to provide a compact and economical control system for shifting a transmission of the kind having fluid actuated clutches and brakes wherein shifting performance may be adjusted and optimized without requiring basic redesign of the system.

The invention together with further objects and advantages thereof will best be understood by reference to the following description of a preferred embodiment in conjunction with the accompanying drawings.

BRIEF DESCRIPTION OF THE DRAWINGS

In the accompanying drawings:

FIG. 1 is a schematic diagram of a planetary transmission for an earthmoving vehicle or the like, FIG. 2 is a schematic diagram of a fluid circuit for controlling the drive conditioning devices of the transmission of FIG. 1 to effect shifts between different drive ratios thereof, FIG. 3 is a section view of a fluid pressure controlling valve group of the system of FIG. 2, FIG. 4 is a graphical diagram of the pressures occurring in the drive conditioning devices of the transmission of FIG. 1 in the course of a shift, FIG. 5 is a graphical indication of the transient loads on the drive line of an associated vehicle which can occur with a transmission of the general type of FIG. 1 with a conventional control system and with the present invention applied thereto, and FIG. 6 is a section view of a second pressure controlling means of the fluid circuit of FIG. 2.

DESCRIPTION OF A PREFERRED EMBODIMENT

To facilitate an understanding of the invention, FIG. 1 schematically illustrates a transmission 11 typical of the type to which the invention is applicable. Transmission 11, described more fully in U.S. Pat. 3,386,540, is of the planetary type and has a drive input 12 and drive output 13, with a torque converter 14 and five planetary gearings 16 through which the several distinct power paths may be selected to provide a plurality of drive ratios between the input and output. As is customary in planetary transmissions, a series of fluid operated drive conditioning devices, constituted by clutches and brakes designated by letters A through G in FIG. 1, are interconnected between the planetary gearings 16 and may be selectively engaged and disengaged to provide for the several transmission settings. This particular transmission 11 provides eight forward speeds in addition to neutral and reverse and the drive conditioning devices A to G which are engaged to provide each distinct power path are as follows:

|  | Position | | | | | | | | | |
| --- | --- | --- | --- | --- | --- | --- | --- | --- | --- | --- |
|  | R | N | 1 | 2 | 3 | 4 | 5 | 6 | 7 | 8 |
| Engaged front device: | A | ---- | A | A | C | B | C | B | C | B |
| Engaged rear (load) device: | G | D | F | E | F | F | E | E | D | D |

Thus, aside from neutral, two of the drive conditioning devices A to F are engaged at each setting of a transmission.

Each of the devices A to G is engaged by applying fluid under pressure to a piston 17 associated therewith and if acceptably smooth shifts are to be effected, careful attention must be given to controlling the rate and timing of the release of pressure from the two devices which are to be disengaged and the rate, timing, and initial and final pressures at the two devices which are engaged in the course of each shift.

For example, one of the two devices A to G which engage at the completion of each shift should engage in advance of the other as the device which engages last, termed the load clutch, is subjected to greater shock loads in that it reconnects the vehicle drive line to the engine whereas the first engaging device merely couples internal components of the transmission. The load clutch may require greater energy capacity and the maximum pressure applied to one of the two drive conditioning devices, the starting point of such pressure and the rate of rise of such pressure may necessarily be different, in addition to the difference in timing. Thus, fairly complex pressure regulating and timing means are needed to control the engagements and disengagements of the devices A to G. A fluid circuit for this purpose is shown in FIG. 2.

The control circuit 18 includes a gear selector control valve 21 receiving fluid under pressure from a pump 19 through a pressure control valve group 22. Gear selector control valve 21 has seven fluid outlets 23A to 23G, each coupled to an individual one of the previously described drive conditioning devices A through G, and functions to direct fluid under pressure to the appropriate pair of such devices at the start of a shift while draining the ones of the devices which were previously pressurized. To initiate shifts, the selector valve 21 has four spool valve piloting means 24 which are manipulated through suitable linkage connecting with the operator's gear shift lever in any of the various ways known to the art.

Reference to the chart given above will show that for each transmission setting other than neutral, one of the devices A, B or C is engaged together with one of the devices D, E, F, and G. Since the present control circuit 18 utilizes the clutches D, E, F and G as the last engaging load clutches, the fluid supplied to the appropriate one of clutches A, B and C through selector valve 21 is controlled separately from the fluid supplied to the clutch D, E, F or G. Accordingly, the selector valve 21 has two separate fluid inputs 26 and 27 from the pressure control valve group 22.

The detailed internal structure of selector control valve 21 may be similar to that of the corresponding component of the transmission control system of U.S. Pat. 3,386,540 and accordingly will not be described herein.

The primary function of pressure control valve group 22 is to sequence and pressure modulate the fluid flows into the two inputs 26 and 27 of the selector control valve 21 to effect smooth shifting although the valve group 22 contains additional components concerned with controlling other aspects of the transmission. The components of primary concern relative to the present invention are indicated schematically in FIG. 2 and shown in detail in FIG. 3.

Referring first to FIG. 2, valve group 22 has a fluid input conduit 29 from pump 19 through a flow constriction 31 and provides a direct flow path 32 from input 29 to the input 26 to selector control valve 21 that supplies fluid to the appropriate one of the front drive conditioning devices A, B or C during a shift. Referring momentarily to FIG. 4, the desired pressure trace at the appropriate one of the forward devices A, B, or C, designated as pressure P2, consists of an initial fill period at which the pressure remains constant at a low value, followed by a short vertical rise once the device has filled, and a modulation period in which the pressure rises gradually to avoid an overly abrupt engagement of the device. After the modulation period, the pressure reaches a maximum value and is maintained thereat.

Referring now again to FIG. 2, this timed control of the pressure in flow passage 32 of valve group 22 is effected primarily by a first pressure modulating relief valve 33 having an input side coupled to the flow passage 32. Valve 33 is essentially a relief valve, which opens when the pressure at its input reaches a predetermined value, wherein the relief pressure is progressively raised over a period of time to produce the modulated pressure rise in flow passage 32 described above. Suitable internal structure for the valve 33 for this purpose will be hereinafter described.

Referring now again to FIG. 4, the desired pressure trace at the load clutch D, E, F or G is designated as P3 and differs from P2 in several respects. In particular, P3 also has an initial fill period at which the pressure is low and relatively constant followed by a short vertical rise but these periods should follow those of P2 rather than occur simultaneously in order to assure that the load device D, E, F or G is the last to engage. Further, in the particular transmission of this example, the fill pressure and the amount of vertical rise immediately thereafter should be somewhat less than the corresponding portions of the P2 pressure trace. Further, the rate of rise of pressure P3 during the modulation period should be somewhat more gradual and the final pressure is smaller. Thus, while the P3 pressure must be related to the P2 pressure, it must also be separately modulated.

Referring now again to FIG. 2, control of the P3 pressures as supplied to selector valve input conduit 27 is primarily the function of a second pressure modulating relief valve 34. In particularly, the output of the first pressure modulating relief valve 33 is directed to the selector valve input conduit 27 to engage the appropriate one of the load clutches D, E, F or G with the input of the second modulating valve 34 also being coupled thereto. Valve 34 is essentially similar in operation to valve 33 in that it is a relief valve which opens to maintain a desired maximum pressure in conduit 27 but is modulated so that this maximum pressure continually rises at the appropriate rate to realize the above described P3 pressure trace. The output of valve 34 is transmitted to other components of the transmission which are not of primary interest relative to the present invention and which are described in detail in U.S. Pat. 3,386,540.

As many of the components of valve group 22 are not primarily involved in realizing the objectives of the present invention and are described in detail in U.S. Pat. 3,386,540 only certain modified components that significantly affect the present invention will be described in detail herein. Referring now to FIG. 3, the direct flow passage 32 from fluid input conduit 29 to selector valve input 26 is defined by internal passages 32' and 32" of valve group 22. FIG. 3 illustrates the structure of the valve group 22 in a rest condition, when no fluid is applied, and under this condition passages 32' and 32" are isolated from each other by a safety valve spool 37. In operation this condition exists only when an attempt is made to start the vehicle with the transmission in gear. When the vehicle is started in neutral, the safety valve spool 37 shifts to the right communicating the passages 32' and 32", the construction and operation of the safety valve being incidental to the present invention and being described in the above mention prior U.S. patent. Considering now the first pressure modulating relief valve 33, a spool 38 is axially movable within a bore 39 and has an edge 41 which fluid must pass to travel from input 29 to the input passage 42 to the second pressure modulating relief valve 34. A spring 43 in bore 39 urges spool 38 in a direction which tends to close the flow path past edge 41. Thus, the pressure in conduits 32 and 26 at any given time is determined by the force which spring 43 exerts on spool 38 as a sufficiently high fluid pressure in input 29 causes the spool 38 to move against the force of spring 43 and relieve fluid into passage 42. To gradually increase the force which spring 43 exerts on spool 38 whereby the pressure in conduit 26 rises gradually during the modulation period, a chamber 46 is communicated with conduit 26, through a flow restriction 47, and a load piston 44 is exposed to the pressure within chamber 46 and bears against the end of spring 43. As the pressure in conduit 26 rises, it is transmitted to chamber 46 to act against the load piston 44 thereby shifting the load piston to progressively increase the force which spring 43 exerts on spool 38. When load piston 44 reaches its limit of travel, valve 33 maintains a constant pressure in conduit 26. A spring loaded check valve 48 has one side communicated with conduit 26 and the other side connected to chamber 46 and opens vent chamber 46 to a drain conduit 50 when the pressure in conduit 26 is relieved to disengage a device A, B or C at the start of a shift. This causes the load piston 44 to return to its start position in preparation for the subsequent modulation period.

As previously described, the fluid which is diverted from the first selector valve input conduit 26 by the relieving action of valve 33 is directed to the second selector valve input conduit 27. For this purpose, valve group 22 provides a flow passage 49 communicated with passage 42 past the safety valve spool 37 which as previously discussed is shifted to the right under operating conditions. To modulate the pressure in conduit 27 to achieve the desird P3 pressure trace as previously described, passage 42 is communicated with the input 51 of the second pressure modulating relief valve 34.

Valve 34 is essentially similar in operation and construction to the first pressure modulating relief valve 33 and includes a spool 52 movable in an axial direction within a bore 53 and having an edge 54 defining a variable flow passage from chamber 51 to an output passage 56. Valve 34 further has a spring 57 urging spool 52 in a direction tending to close the passage from chamber 51 to output 56 and has a load piston 58, exposed to pressure within a chamber 59, which acts to increase the force of spring 57 against spool 52 as the load piston shifts in response to pressure increases in chamber 59. Chamber 59 is communicated with the input to the second pressure modulating relief valve 34 through passages 61 and 62 having flow restrictions 63 therein, passages 61 and 62 are branches of a passage 64 which communicates with chamber 51 when the safety valve spool 37 is in its shifted position. Thus, load piston 58 is shifted to increase the force which spring 57 exerts against spool 52 as the pressure rises in selector valve input conduit 27 thereby providing for the desired gradual pressure rise during the modulation period of the shift transient. Load piston 58 is restored to its initial position at the start of a shift by opening of a spring loaded check valve 66 which is essentially similar to the previously described check valve 48.

Referring now again to FIG. 2, the above described fluid control circuit 18 is theoretically capable of providing the desired P2 and P3 pressure traces of FIG. 4 following a shifting of the selector control valve 21. The practical fact is that the actual pressures experienced at the clutches or brakes may vary considerably from the ideal patterns particularly if the transmission construction itself is altered in some way. Variations in the effective flow passages between selector valve 21 and the clutches and brakes A to G or differences in capacities of the clutches and brakes themselves, for example, may affect the pressures reflected back to conduits 26 and 27 and thereby influence the action of the pressure modulating and relief valve 33 and 34. FIG. 5, for example, illustrates an extremely undesirable condition found to occur in the second gear to third gear shift in a transmission system of the kind shown in U.S. Pat. 3,386,540 when the transmission is larger than that for which the system was optimized. The solid line 67 of FIG. 5 illustrates torque variations during the shift period and it may be seen that there are not only severe rapid fluctuations but an actual torque reversal occurs. This generates severe shock loads in the transmission.

The present invention provides for reducing this kind of problem through supplementary individual pressure control in the flow path between selector control valve 21 and the particular one or ones of the drive conditioning devices A through G which may be found to contribute to rough shifting. In this example, such supplementary control is provided between the selector control valve 21 and the drive conditioning devices F and E by means of individual supplementary pressure control systems 68 and 68' connected therebetween.

Both such supplementary pressure control systems 68, and 68' may be essentially similar and accordingly system 68 will only be described in detail. Referring now to FIG. 6, system 68 includes a housing 69 having a fluid input 71 from the selector control valve 21 and having a fluid outlet 72 to the associated drive conditioning device which in this instance is brake F. Inlet 71 is communicated with outlet 72 through a check valve 73 for purposes to be hereinafter discussed.

To provide the desired supplementary pressure modulating function in close proximity to the brake F, outlet 72 is communicated with an inlet chamber 74 of an additional pressure modulating relief valve 76. Valve 76 includes a spool 77 which is movable in an axial direction within a bore 78 and which has an edge 79 defining a variable flow passage to a drain outlet 81. Inlet chamber 74 is an enlarged portion of bore 78 and the pressure within the chamber acts against spool 77 in a direction tending to open the flow passage past edge 79, such action being provided for by a chamber 85 in the end of the valve spool which is communicated by valve spool passages 82 with chamber 74 and which contains a reaction slug 83. This force is opposed by a spring 84 which acts against the other end of spool 77 in a direction tending to close the flow passage past edge 79.

A load piston 86 is situated at the opposite end of bore 78 from spool 77 and bears against spring 84 whereby axial movement of the load piston increases the force of the spring against spool 77. The fluid pressure in the inlet chamber 74 is transmitted to the end of the load piston 86 through a passage 87 having a constriction 88. Thus, load piston 86 gradually moves towards spool 77 and a rising pressure in chamber 74 results because the increased force on spool 77 tends to restrict flow past edge 79. Load piston 86 moves leftwardly due to area differences between itself and slug 83. This in turn provides the desired modulation in that the pressure in chamber 74 must rise to a progressively higher level before it is relieved past the edge 79.

To hold the load piston 86 on its seat during the initial fill period and to provide a reference force thereon, a second spring 89 acts between the piston and a washer 91 fixed in bore 78. To relieve the fluid pressure acting on the load piston 86 when the pressure at the associated brake F is dumped, flow constriction 88 is bypassed by a check valve 92 which can transmit flow in a direction away from the load piston only.

Accordingly, pressure modulating relief valve 76 acts to supplement the pressure control upstream from the selector valve to assure that the desired pressure rise trace is present at brake F during engagement of the brake.

Since the difficulties heretofore described with reference to FIG. 5 are largely confined to the initial two-thirds of the modulation period and since use of the supplementary system 68 to resolve these difficulties involves an additional drain of fluid (through conduit 81) which should not be continued any longer than necessary, means are provided to de-activate system 76 during the final third of the modulation period. In particular, an axial projection 93 on the load piston 86 extends toward spool 77 and is proportioned to seat against the spool when the load piston has shifted an amount corresponding to two-thirds of the modulation period. Once projection 93 seats against the spool 77 in this manner, spring 84 no longer has any effect and the spool shifts to close all flow past edge 79. Modulation for the remainder of the shift transient is then accomplished through the previously described primary pressure control valve 22.

FIG. 4 graphically illustrates the practical effect of the modulation system 68. In particular, the dashed line pressure trace $P3_1$ of FIG. 4 illustrates the conditions which would exist at brake F in the absence of the system 68 and which aggravate the undesirable shock load phenomena illustrated in FIG. 5. The dotted line pressure $P3_2$ trace of FIG. 5 illustrates the pressure conditions at brake F during the shift transient when the system 68 is operative thereon. The modification of pressure trace $P3_1$ to trace $P3_2$ alters the drive line loading as illustrated by dashed line 67' in FIG. 5. It may be seen that torque reversals, severe torque fluctuations and the undesired delay in the rise of torque with time have been minimized.

In adapting the system to the practical conditions which may be found to exist in particular transmissions, it may be desirable to delay the disengagement of one or more drive conditioning devices in addition to providing the supplementary pressure modulation during the engagement phase. As shown in FIG. 6, system 68 provides for this by means of the check valve 73 which opens to permit rapid fill during engagement but which blocks an equally rapid release of fluid from behind load piston 86 when the selector valve is operated to disengage the brake F. Check valve 73 is bypassed by a passage 94 having a flow restriction 96 through which the fluid must discharge. Thus, the sizing of flow restriction 96 determines the rate of disengagement of the brake.

What is claimed is:

1. In a control system for a transmission having a plurality of fluid actuated drive conditioning devices which may be engaged and disengaged to obtain selected ones of a plurality of drive ratios, the combination comprising:
    a source of fluid under pressure,
    a selector valve coupled between said source of fluid and said devices for directing said fluid to predetermined ones thereof to shift between said drive ratios,
    first pressure controlling means disposed at the flow path between said source of fluid and said selector valve for modulating the pressure of fluid supplied to any of said devices through said selector valve, said first pressure controlling means having engagement modulating means for establishing a predetermined pattern of gradual progressively increasing pressure in the fluid transmitted to said selector valve from said source following shifting of said selector valve,
    second pressure controlling means disposed at the flow path between said selector valve and at least one individual one of said devices for further modulating the fluid supplied to that individual one of said devices, said second pressure controlling means having engagement modulating means for establishing a second predetermined pattern of gradual progressively increasing pressure at said individual one of said devices which second pattern differs from that concurrently established for others of said devices by said first pressure controlling means,
    wherein said second pressure controlling means comprises means defining a flow path between said selector valve and said individual one of said drive conditioning devices and a relief valve having an input coupled to said flow path, said relief valve having a movable element defining a pressure relief flow passage and having resilient means bearing against said movable element in a direction tending to close said flow passage and having means which varies the force exerted on said movable element by said resilient means over a period of time following operation of said selector valve whereby the pressure in said flow path progressively rises during said period, and wherein said means varying the force exerted by said resilient means comprises a movable load piston bearing against said resilient means and means transmitting fluid pressure from said input of said relief valve to said load piston through a flow constriction whereby the pressure of said fluid on said load piston rises gradually as fluid flows through said constriction, and
    stop means for contacting said load piston and said movable element prior to complete engagement of said individual device whereby said second pressure controlling means is inactivated prior to complete engagement of said individual device with the control of pressure in said flow path thereafter being effected solely by said first pressure controlling means.

2. The combination defined in claim 1 wherein said drive conditioning devices consist of a first group thereof and a second group thereof and wherein different ones of said drive ratios are realized by engaging selected pairs of said devices wherein each selected pair includes one device from the first group and one device from the second group and wherein said first pressure controlling means has means for delaying said predetermined gradual pressure increase at the selected device of said second group relative to the predetermined gradual pressure increase at the selected device of said first group whereby said devices of said second group constitute load devices which engage subsequent to engagement of the devices of said first group and thereby sustain the load forces associated with reestablishing drive through said transmission, wherein said second pressure controlling means is coupled between said selector valve and an individual one of said devices of said second group.

3. The combination defined in claim 2 wherein said selector control valve has a pair of fluid inputs from said first pressure controlling means with fluid from the first of said inputs being directed to said first group of said devices and fluid from the second of said inputs being directed to devices of said second group and wherein said first pressure controlling means raises the fluid pressure at said first input at a first rate and raises the fluid pressure at said second input at a different rate with the rise of pressure at said second input being subsequent to that at said first input.

4. The combination defined in claim 3 wherein said first pressure controlling means comprises means forming a first flow passage between said source of pressurized fluid and said first input of said selector valve, a first pressure modulating relief valve having an input coupled to said first flow passage and having an output, means forming a second flow passage from said outlet of said first pressure modulating relief valve to said second input of said selector valve, and a second pressure modulating relief valve having an input coupled to said second flow passage.

(References on following page)

References Cited

UNITED STATES PATENTS

| | | | |
|---|---|---|---|
| 3,255,642 | 6/1966 | Christenson et al. | 74—869 X |
| 3,023,636 | 3/1962 | Kelley et al. | 74—Dig. 1 |
| 3,101,012 | 8/1963 | Christenson et al. | 74—Dig. 1 |
| 3,138,971 | 6/1964 | Fisher et al. | 74—Dig. 1 |
| 3,181,677 | 5/1965 | Fisher et al. | 74—Dig. 1 |
| 3,181,394 | 5/1965 | Ramsel et al. | 74—753 X |
| 3,207,182 | 9/1965 | Edmunds | 74—Dig. 1 |
| 3,293,935 | 12/1966 | Tuck et al. | 74—Dig. 1 |
| 3,386,540 | 6/1968 | Horsch et al. | 192—109 F |
| 3,452,621 | 7/1969 | Golan et al. | 192—109 F X |

CARLTON R. CROYLE, Primary Examiner

T. C. PERRY, Assistant Examiner

U.S. Cl. X.R.

74—Dig. 1, 740; 192—109 F